Feb. 15, 1972 R. BAJULAZ Re. 27,283

CARRYING ELEMENT

Original Filed May 25, 1964 2 Sheets-Sheet 1

INVENTOR.

ROGER BAJULAZ

By Irvin S. Thompson

ATTY.

CARRYING ELEMENT
Original Filed May 25, 1964 2 Sheets-Sheet 2
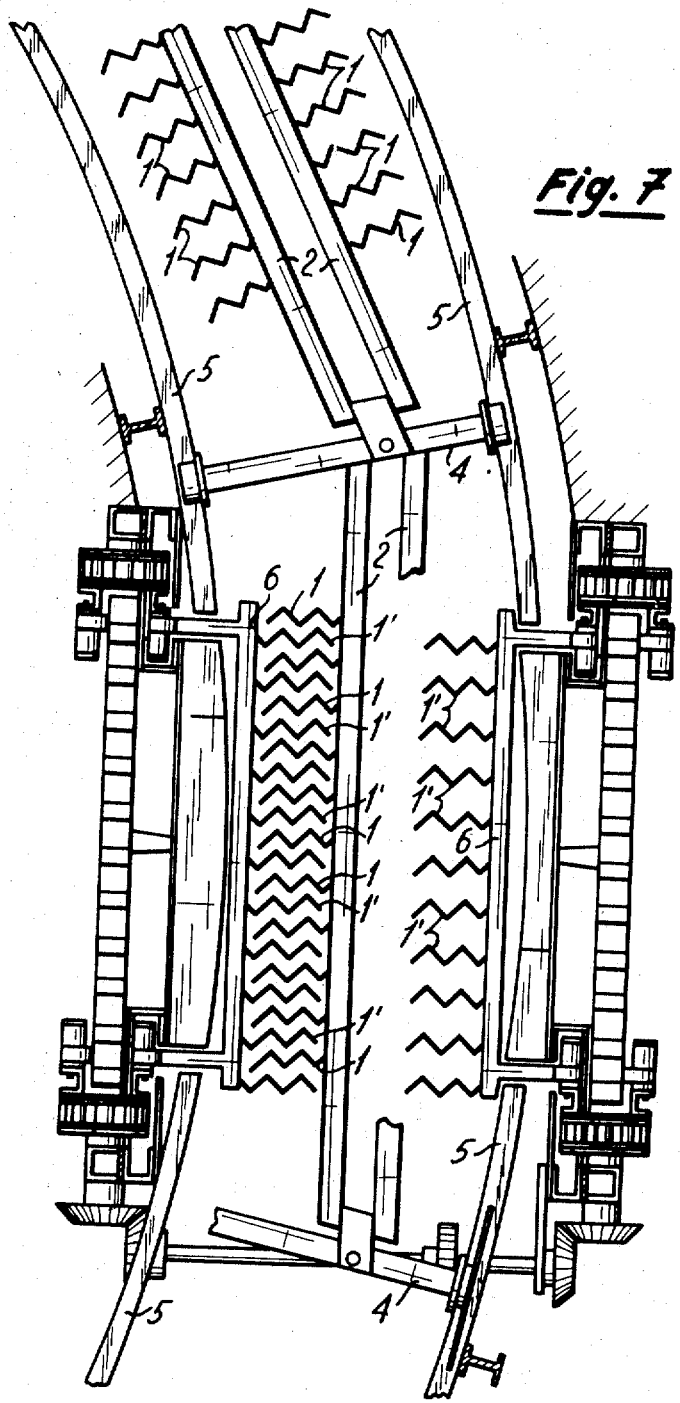
INVENTOR
ROGER BAJULAZ
BY Irwin S. Thompson
ATTY.

United States Patent Office

Re. 27,283
Reissued Feb. 15, 1972

27,283
CARRYING ELEMENT

Roger Bajulaz, Geneva, Switzerland, assignor to Rotopark S.A., Geneva, Switzerland Original No. 3,260,353, dated July 12, 1966, Ser. No. 369,991, May 25, 1964. Application for reissue May 5, 1970, Ser. No. 34,925
Claims priority, application Switzerland, May 30, 1963, 6,774/63
Int. Cl. B65g *15/00*
U.S. Cl. 198—156 7 Claims

Matter enclosed in heavy brackets [ ] appears in the original patent but forms no part of this reissue specification; matter printed in italics indicates the additions made by reissue.

The present invention has for its object a carrying element for a storage installation support in which a load is transferred from a first to a second support by the passage of these supports one through the other, characterized by the fact that this element comprises a bearing surface which seen from above shows parts offset on either side of the longitudinal symmetry plane of this carrying element.

The accompanying drawing shows diagrammatically and by way of example a few possible embodiments of the carrying element.

FIG. 7 shows partially a mechanical garage installation equipped with carrying elements, according to the invention.

Figure 1:
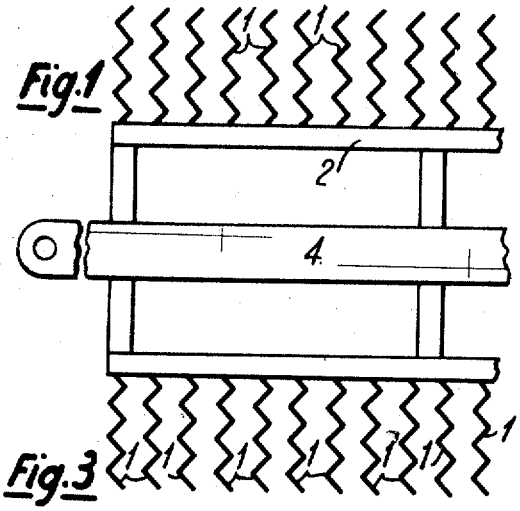
FIG. 1 is a partial view from above of a support provided with carrying elements.
Figure 2:
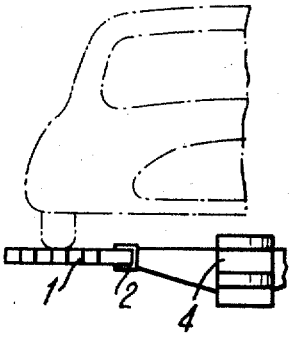
FIG. 2 is a partial view in side elevation of the support shown in FIG. 1.
Figure 3:
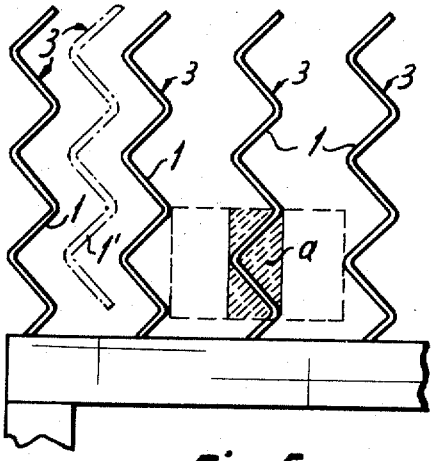
FIG. 3 is a detail on a larger scale showing carrying elements of FIGS. 1 and 2.

The carrying elements which are the object of the present invention are adapted to be employed in storage installations comprising supports provided with carrying elements in which loads are transferred from a first support onto a second support by the passage of these supports one through the other. An installation of this type is for example that described in Patent No. 3,204,785 (application No. 146,872, filed on October 25, 1961).

In this type of installation specially envisaged for the parking of motor vehicles the production of these carrying elements presents particularly difficult problems. One must in particular produce carrying elements of sufficient resistance for a single element to be able to carry a quarter of the weight of the heaviest vehicle taken into account, to which are added the safety factors, but having nevertheless a small width so that the distance separating two adjacent carrying elements be small. This is particularly difficult to carry out for heavy loads, such as cars weighing up to about 4900 lbs. (2200 kg.). Moreover, it is necessary that the distance between the adjacent carrying elements be small so as to be able to carry loads resting on small surfaces which is the case of the tires of motor vehicles.

Moreover an additional requirement appears when it is desired to carry cars on such supports. Indeed, it is necessary that in whatever way the car is placed, the tires of said car should rest on a sufficient surface so that they do not sink or fold in a dangerous manner. In fact, when the tread of a tire folds too much there is a great risk that its cord be damaged.

As a matter of fact in present installations the two following concepts are to be found:

(a) Utilization of carrying elements of large dimensions to impart thereto a sufficient resistance, but this necessarily leads to large spaces between the elements, so that if a tire rests between two elements thus disposed it is deformed and engages itself strongly between these two elements thus producing an inadmissible jamming.

(b) Utilization of elements of small dimensions which permits of reducing the distance between two adjacent elements. In this case if a tire rests solely on one element said element sinks into the tread and deforms the tire to an exaggerated extent, which only rests on this element along one contact line.

The present invention relates to a new type of carrying elements for mechanical garage installations tending to remove the above mentioned serious disadvantages.

The carrying elements 1 according to the invention are rigidly or mechanically fixed, parallel one to the other, by one of their ends along side-members 2 forming part of the frame of a support for the mechanical storage installation. Each of these side-members 2 provided with its carrying elements thus presents the general shape of a comb, which can moreover be found in existing installations.

However, the originality of the present invention resides in the structure or the conception of the various carrying elements 1. Indeed, these carrying elements 1 comprise a bearing surface 3 which, seen from above, has parts offset on either side of the longitudinal symmetry plane of the said element. This essential particularly permits of producing strong carrying elements, having a proper small thickness, which permits of disposing them at a short distance one from the other, but the carrying area of which is very large. This carrying area is defined by a horizontal plane passing through the bearing surface 3 but limited laterally by lines connecting the most distant points of the symmetry axis of the element situated on either side of this axis respectively.

One thus produces all the characteristics of a carrying element necessary for a faultless operation of a mechanical garage installation, i.e.:

(a) Large bearing area of each carrying element.

(b) Small distance separating two adjacent carrying elements.

These two characteristics, united for the first time, are in fact absolutely necessary to prevent any excessive deformation of the tires of a car resting on such elements. Since the carrying area is large, the tire will not undergo any excessive deformation when it rests on a single element.

Furthermore, the distance separating two carrying areas relative to two adjacent elements is less than the pitch or the distance separating these two elements. This is possible due to the outline of each element. In this way the deformation of a tire resting on two adjacent elements is also small. In practice, the deformation of the tire, in whatever way said tire rests on the carrying elements, is comparable to the deformation which it undergoes when it is in contact with the flat ground.

FIGS. 1 to 3 and 7 show very partially a mechanical garage installation which comprises supports 4, including side-members 2 provided with carrying elements 1, movable horizontally along rails 5. This installation further comprises a lifting appliance the platforms of which are constituted by second supports 6 provided with carrying elements 1', identical to those carried by the supports 4. These supports 4 and these second supports 6 are arranged in such a way that when they are alined vertically one relative to the other, the second supports 6 pass during their vertical movement through the support 4. As a matter of fact, when the second support 6 passes through he support 4 the carrying elements 1 and 1' are interposed and each passes into the space provided between wo elements carried by the other support.

In this embodiment, the carrying elements 1 and 1' are ll constituted by flat bars bent zigzag and one of whose ateral edges forms the bearing surface 3. The strength nd rigidity of the elements may be increased at will by ncreasing the width of the bar which in no way changes he structure of the element seen from above, that is to ay perpendicularly to the bearing surface. Due to this riginal outline it is possible to produce supports, for exmple by means of flat bars of a thickness of about 0.4 n., having a carrying area of a width of about 2 to 4 in., whereas the adjacent elements are also separated by about 3 to 6 in. This distance between adjacent elements could even be still more reduced, and in fact it is determined olely by the accuracy of the positioning of the first supports relative to the second supports. Now, an accuracy of ±0.6 in. is easily obtained which means that it is necessary that the distance between two adjacent carrying elements must be, at a minimum, equal to 1.2 in. in addition to the thickness of the element, which in the present case would thus be from 2 to 2.4 in. Moreover, it is obvious that the wave length of the zigzag of the elements must be equal to or less than the width of a tire, that is o say about 4 to 6 in. As a matter of fact, in this case, even if a tire should rest only on one element, the carrying surface would be equal to the width of the tire multiplied by the width of the carrying area of the carrying element, this due to the fact that the tread of a tire does not have the same possibility of deformation along a V-shaped line as along a straight line.

The few dimensions given above by way of example clearly show that a tire, which presents a surface of contact with a flat surface which is a minimum of 4 by 6 in., s in contact with a support provided with carrying elements according to the invention over a surface at least as large as the said surface of contact, which could not be obtained up to the present.

Figure 4:
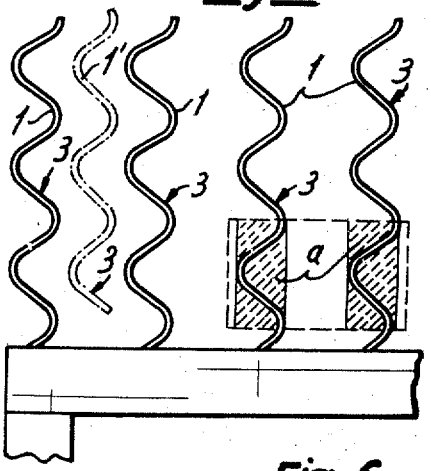
FIG. 4 is a detail on a larger scale showing a first variant of the carrying elements.
Figure 5:
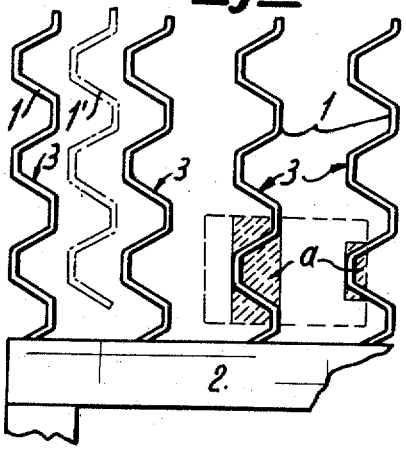
FIG. 5 is a detail on a larger scale showing a second variant of the carrying elements.

It is quite obvious that the carrying elements 1, 1' may have, seen from above, shapes differing from that of a broken line without departing from the scope of protection claimed. In particular, the sinusoidal and trapezoidal shapes shown in FIGS. 3 and 4 respectively are also possible and permit of obtaining the same results as the embodiment described with reference to FIGS. 1 o 3 and 7.

Figure 6:
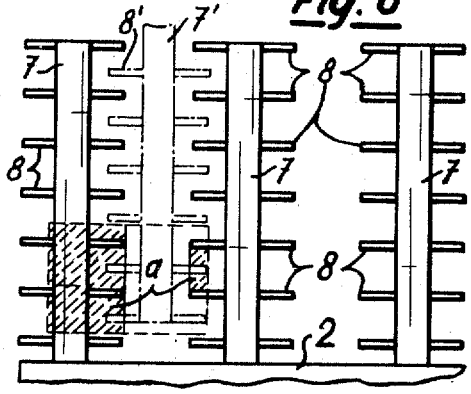
FIG. 6 is a detail on a larger scale showing a third variant of the carrying elements.

The last modified form of the carrying elements according to the invention, shown in FIG. 6, also has a bearing surface comprising parts offset on either side of the ongitudinal symmetry plane of the element.

In this modified form each carrying element is contituted by a central core 7 carrying cross-pieces 8 projecting from either side of this core 7. Each carrying element thus has the general shape of a ladder.

By way of example the following dimensions may be given: width of the core 1.6 in.; width of the cross-pieces 1.8 in.; distance separating two elements 6.4 in. Here again it is easy to see that a tire resting on such a support has a carrying area at least equal to its surface of contact with a flat surface.

By way of example and to illustrate the way in which tire rests on a support provided with the carrying elements described, the surface of contact which a tire would have with a flat tread has been drawn in dot and dash lines in FIGS. 3, 4, 5 and 6. Following the position which a tire may occupy relative to the carrying elements, he carrying surface a is more or less large. However, his carrying surface a is always at least equal to the width of the tire multiplied by the width of the carrying area of a carrying element. This minimum carrying surface a is still quite sufficient to ensure a small deformation of the tire. Moreover, due to the closeness of the adjacent carrying elements it is impossible for the tire to jam between two of these carrying elements.

I claim:

1. A car storage installation comprising [a] first and second [support] *carrying elements* [having interfingering portions], means for vertically moving one of said [supports] *carrying elements* to transfer a load from either [support] *element* to the other *element* [support, said interfingering portions when seen in plan view having a general shape of zig-zag line.] *each carrying element having a plurality of first bearing surfaces disposed on one side of an axis which axis bisects the longitudinal symmetry plane of the carrying element, said first bearing surfaces being spaced apart from one another; a plurality of second bearing surfaces disposed on the other side of the axis said second bearing surfaces being spaced apart from one another; the first set of bearing surfaces offset from the second set of bearing surfaces said carrying element in a plan view describes generally a zig-zag line and said first and second carrying elements having interfingering portions.*

*2. The installation of claim 1 wherein the zig-zag pattern of the carrying element follows a generally sinusoidal path.*

*3. The installation of claim 1 wherein the zig-zag pattern of the carrying element follows a generally trapezoidal path.*

*4. The installation of claim 1 wherein the means for vertically moving one of said elements to transfer a load from either element to the other element includes platform means, said platform means having a plurality of first carrying elements thereon.*

*5. The installation of claim 4 which includes side member means and wherein said side member means includes a plurality of second carrying elements thereon adapted to interfinger with the first carrying elements.*

*6. The installation of claim 1 which includes:*

*side member means, said side member means having two sets of second carrying elements secured to either side of the side member means;*

*platform means, said platform means disposed on either side of the side member means, each said platform means having a plurality of first carrying elements thereon; and*

*the platform means is adapted to move vertically with respect to the side member means which side member means is adapted to move horizontally along rail means, said first and second carrying elements being arranged such that when they are aligned vertically one relative to the other, the first set of carrying elements pass during their vertical movement through the second set of carrying elements.*

*7. The installation of claim 6 which includes a plurality of side member means, having carrying elements thereon, serially connected and adapted to move horizontally upon a circuitous rollway.*

References Cited

The following references, cited by the Examiner, are of record in the patented file of this patent or the original patent.

UNITED STATES PATENTS 1,274,385 8/1918 Colburn ---------- 198—189

FOREIGN PATENTS 1,289,447 2/1962 France --------- 214—16.1 CB

RICHARD E. AEGERTER, Primary Examiner

A. N. GOODMAN, Assistant Examiner

U.S. Cl. X.R.

214—16.1 CB